United States Patent [19]

Kapany et al.

[11] Patent Number: 4,993,796
[45] Date of Patent: Feb. 19, 1991

[54] FIBER OPTICS COMMUNICATION MODULES

[75] Inventors: Narinder S. Kapany, Woodside; Fred C. Unterleitner, Palo Alto, both of Calif.

[73] Assignee: Kaptron, Inc., Palo Alto, Calif.

[21] Appl. No.: 535,249

[22] Filed: Jun. 8, 1990

Related U.S. Application Data

[63] Continuation of Ser. No. 425,440, Oct. 23, 1989, abandoned, which is a continuation of Ser. No. 802,066, Nov. 25, 1985, abandoned, which is a continuation of Ser. No. 462,296, Jan. 31, 1983, abandoned, which is a continuation-in-part of Ser. No. 325,256, Nov. 27, 1981, Pat. No. 4,479,697, which is a continuation-in-part of Ser. No. 66,376, Aug. 14, 1979, Pat. No. 4,329,017.

[51] Int. Cl.$^5$ .............................. G02B 7/26; H04J 1/00
[52] U.S. Cl. ............................... 350/96.15; 350/96.18; 350/96.19; 350/96.20; 350/96.16; 250/227.11; 370/1; 370/3
[58] Field of Search ............... 350/96.10, 96.15, 96.16, 350/96.17, 96.18, 96.20, 96.21, 172, 173, 174; 250/227.11; 370/1, 2, 3

[56] References Cited

U.S. PATENT DOCUMENTS

| 3,244,075 | 4/1966 | Richards et al. | 350/96.19 X |
| 3,883,223 | 5/1975 | Hudson | 350/96.16 |
| 3,886,544 | 5/1975 | Narodny | 340/365 |
| 3,973,850 | 8/1976 | Pouey | 356/100 |
| 4,013,342 | 3/1977 | Narodny | 350/96.15 X |

(List continued on next page.)

FOREIGN PATENT DOCUMENTS

| 0037787 | 4/1981 | European Pat. Off. | 350/96.19 X |
| 0099823 | 2/1984 | European Pat. Off. | 350/96.16 X |
| 2530392 | 7/1984 | European Pat. Off. | 350/96.16 X |
| 2415046 | 10/1975 | Fed. Rep. of Germany | 350/96.15 X |
| 2655114 | 6/1977 | Fed. Rep. of Germany | 350/96.18 X |
| 2703887 | 8/1977 | Fed. Rep. of Germany | 350/96.18 X |
| 2299657 | 8/1976 | France | 350/96.15 X |
| 0148390 | 5/1981 | German Democratic Rep. | 350/96.16 |
| 54-88136 | 7/1979 | Japan | 350/96.15 X |
| 54-130046 | 10/1979 | Japan . | |
| 55-28029 | 2/1980 | Japan . | |
| 56-60401 | 5/1981 | Japan . | |
| 56-102806 | 8/1981 | Japan | 350/96.18 |
| 1017354 | 1/1966 | United Kingdom | 350/96.15 X |
| 1542194 | 3/1979 | United Kingdom | 350/96.15 X |

OTHER PUBLICATIONS

E. G. Lean, "Taps for Multimode Fibers", *IBM Tech. Disc. Bull.*, vol. 21, No. 4, Sep. 1978 (p. 1685).
R. J. Lynch, "Fiber Optic Connectors", *IBM Tech. Discl. Bull.*, vol. 13, No. 2, Jul. 1970 (pp. 533-534).
Bressani et al., "Pivoting Light Guides," *Nuclear Instruments & Methods* (1976), 136:401-402.
Reinhart, "Light Switch for Fiber Optics," *IBM Technical Disclosure Bulletin*, vol. 19, No. 12, May 1977, pp. 4681-4682.
Revue de Physique Appliquee, vol. 19, No. 2, Feb. 1984; by Ph. Gacoin, J. Cl. Gautherin, F. Bos, D. Lepere, J. Flammand and J. P. Laude.

*Primary Examiner*—Brian Healy
*Attorney, Agent, or Firm*—Townsend and Townsend

[57] ABSTRACT

The present invention provides modules for interfacing optical fibers with very low light loss and with provision for monitoring of the optical signal. The modules according to the present invention are characterized by the precise tolerances required in high capacity optical communication systems and yet may be mass produced at reasonable costs. A device according to the present invention comprises an imaging element having a curved reflective surface at one end and prealigned fiber insertion holes at the other end. Various embodiments of the invention are disclosed.

22 Claims, 8 Drawing Sheets

U.S. PATENT DOCUMENT

| | | | |
|---|---|---|---|
| 4,079,382 | 3/1978 | Henry | 343/753 |
| 4,094,578 | 6/1978 | DiVita et al. | 350/96.15 X |
| 4,102,579 | 7/1978 | Stewart | 356/201 |
| 4,111,524 | 9/1978 | Tomlinson, III | 350/96.16 |
| 4,143,941 | 3/1979 | Soref | 350/96.16 |
| 4,153,330 | 5/1979 | Tomlinson, III | 350/96.19 |
| 4,156,556 | 5/1979 | Klein et al. | 350/96.15 |
| 4,182,544 | 1/1980 | McMahon | 350/96.16 |
| 4,198,117 | 4/1980 | Kobayashi | 350/96.19 |
| 4,208,094 | 6/1980 | Tomlinson, III et al. | 350/96.19 |
| 4,243,297 | 1/1981 | Elion | 350/96.22 |
| 4,253,330 | 3/1981 | Matthijsse | 350/96.19 |
| 4,257,673 | 3/1981 | Matthijsse | 350/96.19 |
| 4,280,751 | 7/1981 | DiVita | 350/96.18 |
| 4,290,667 | 9/1981 | Chown | 350/96.18 |
| 4,329,017 | 5/1982 | Kapany et al. | 350/96.18 |
| 4,479,697 | 10/1984 | Kapany et al. | 350/96.18 |
| 4,755,017 | 7/1988 | Kapany | 350/96.18 |
| 4,763,978 | 8/1988 | Courtney-Pratt et al. | 350/96.18 |
| 4,781,426 | 11/1988 | Baker | 350/96.16 |
| 4,934,784 | 6/1990 | Kapany et al. | 350/96.18 |

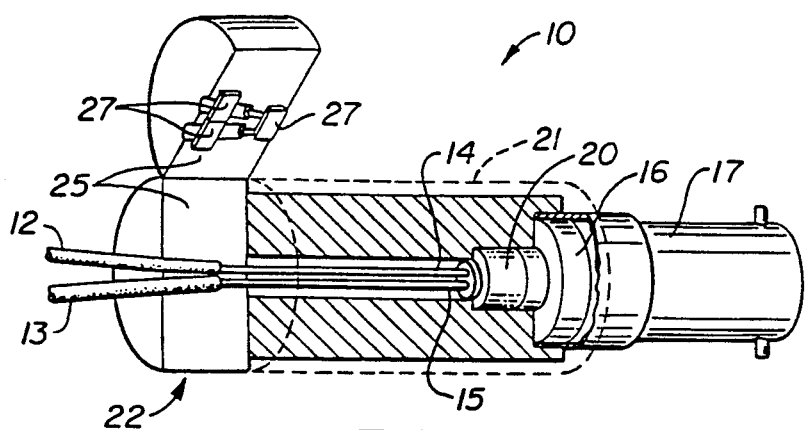
FIG._1.
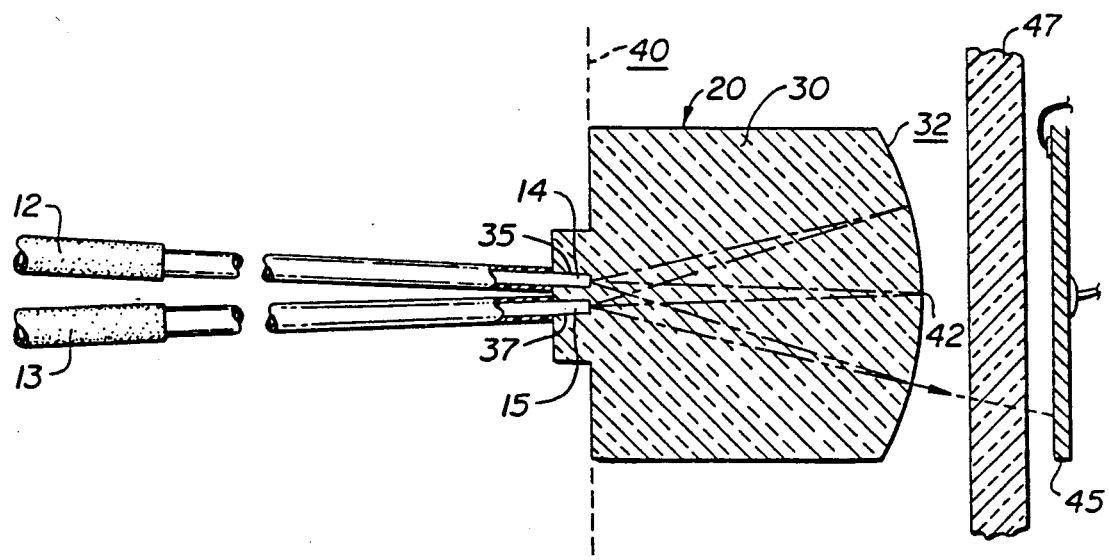
FIG._2.
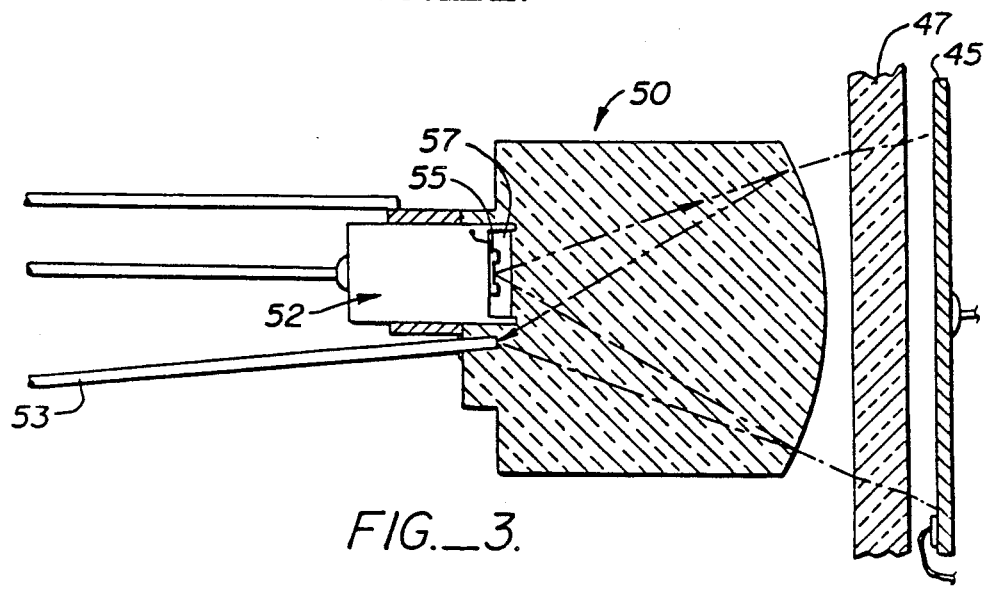
FIG._3.

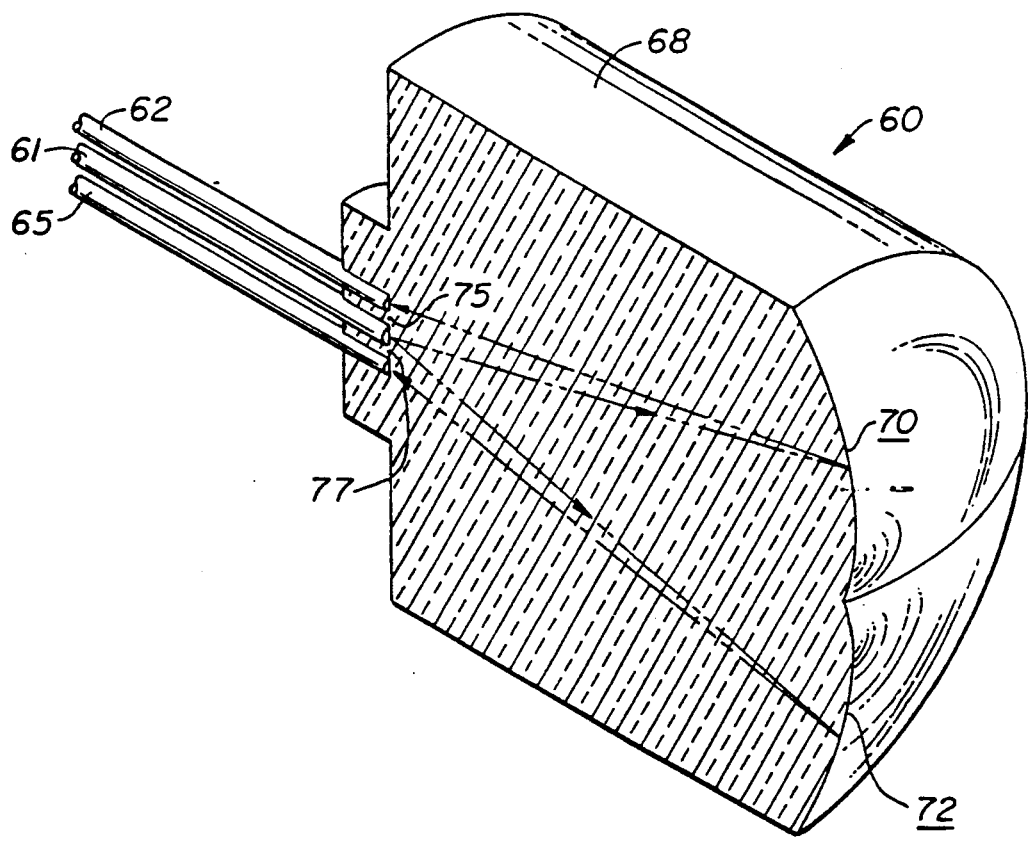
FIG._4A.
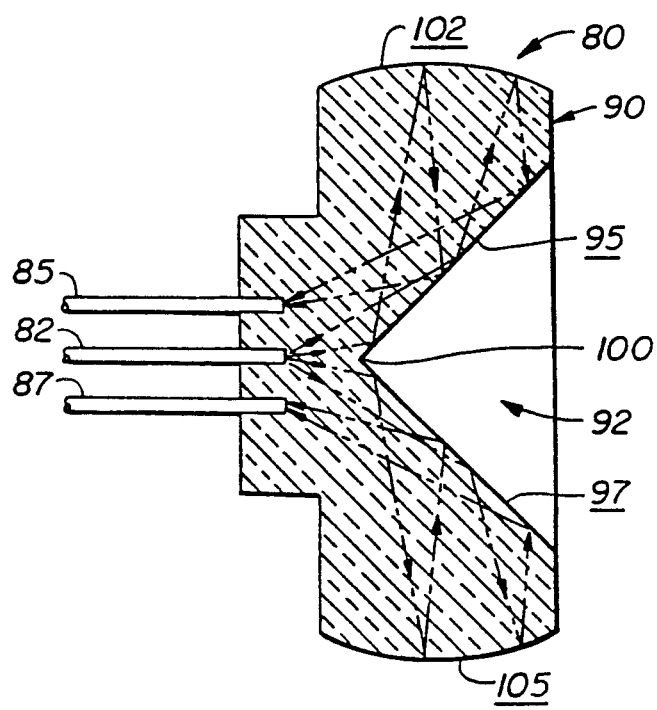
FIG._4B.

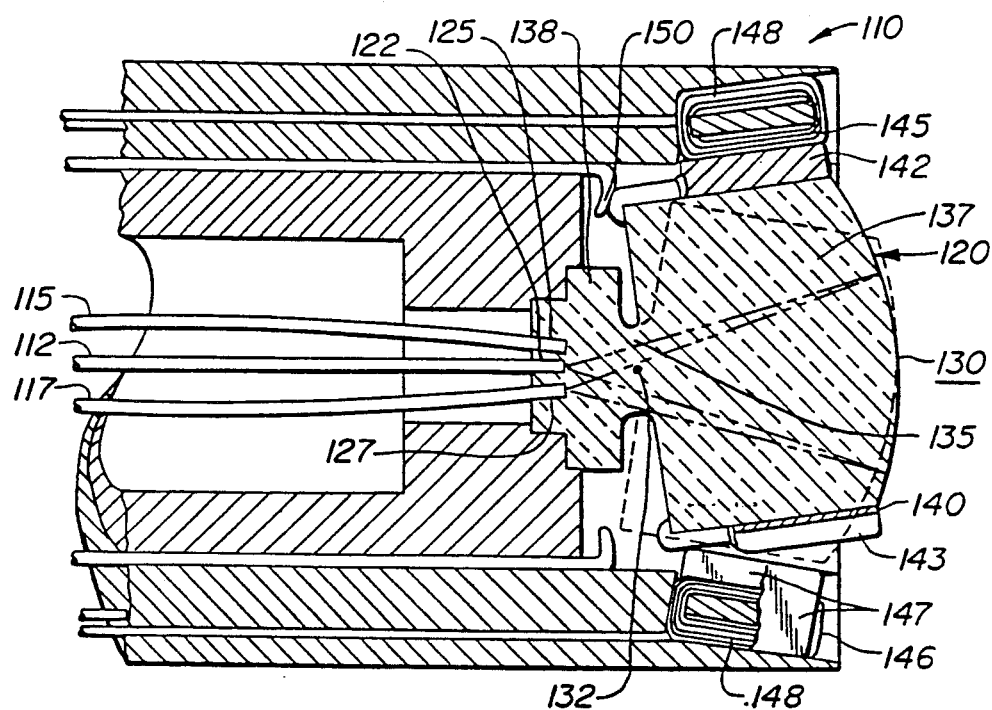
FIG._5A.
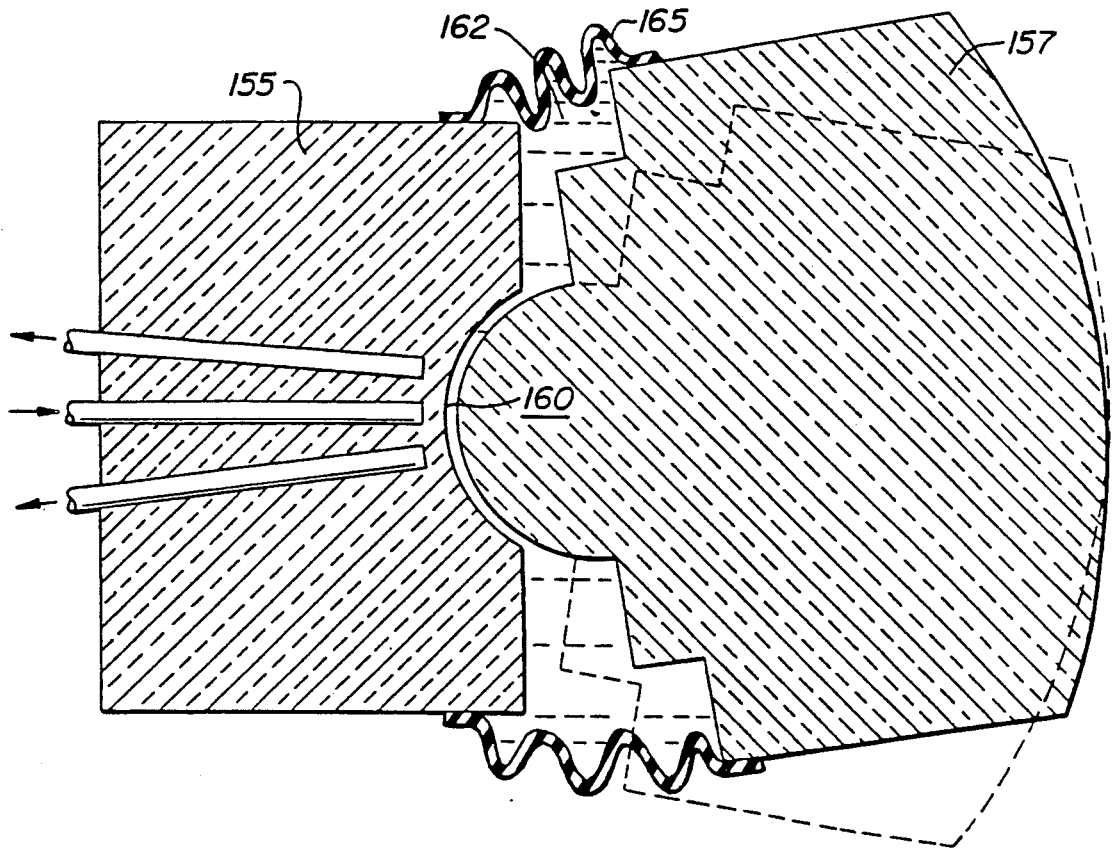
FIG._5B.

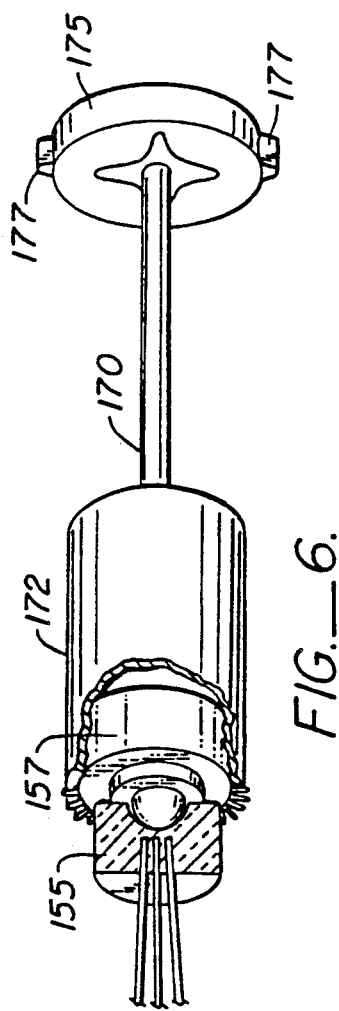
FIG._6.
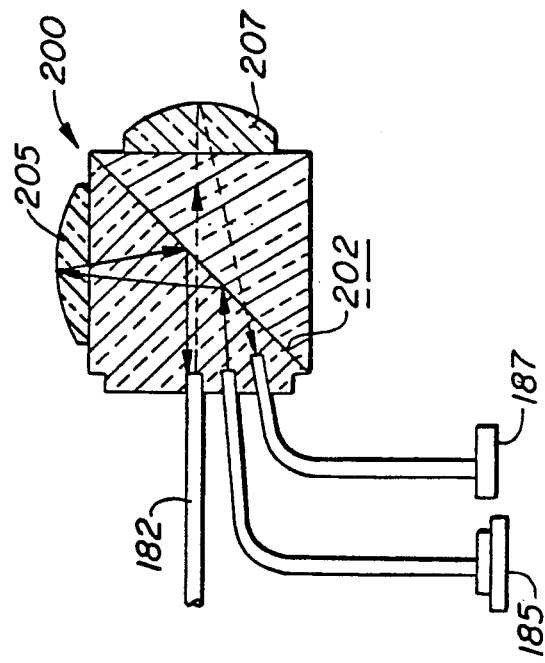
FIG._7B.
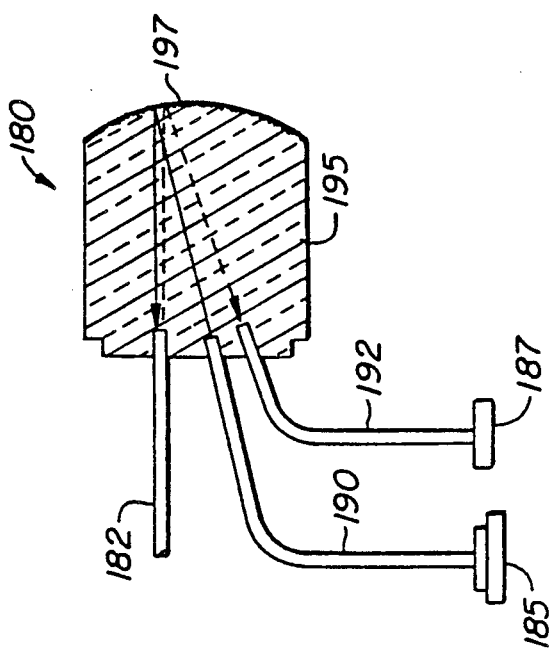
FIG._7A.

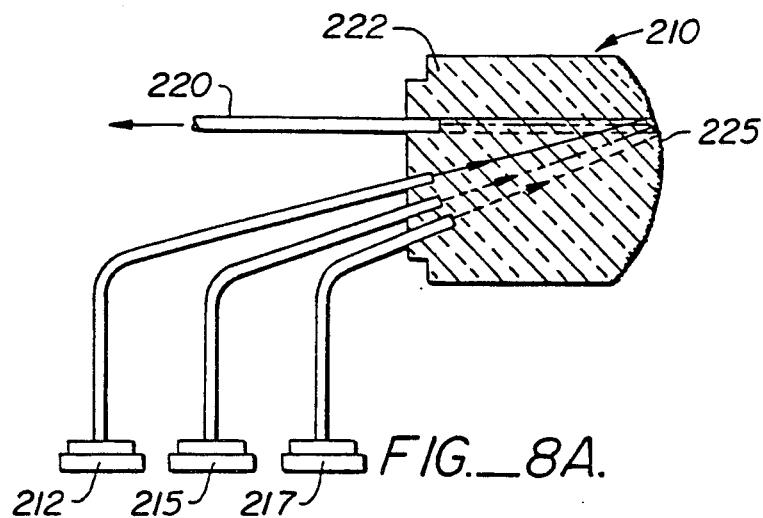
FIG._8A.
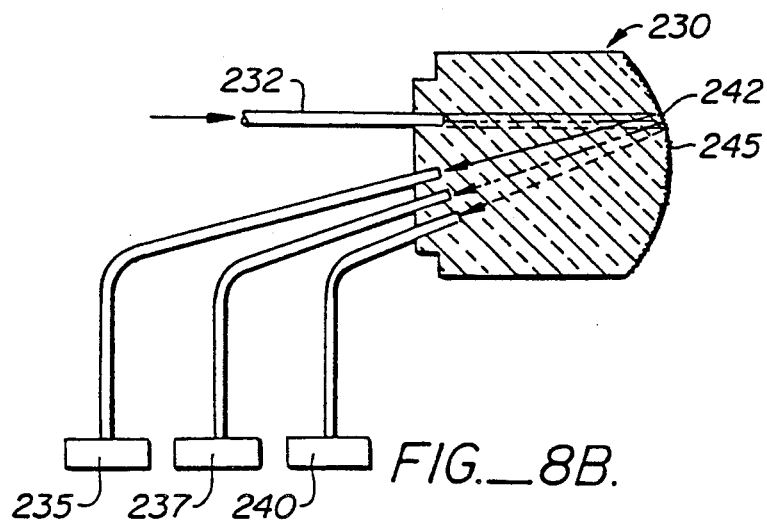
FIG._8B.
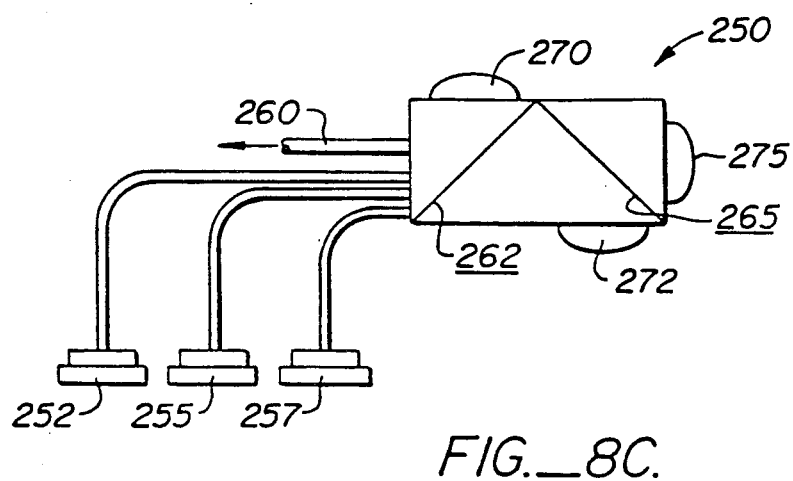
FIG._8C.

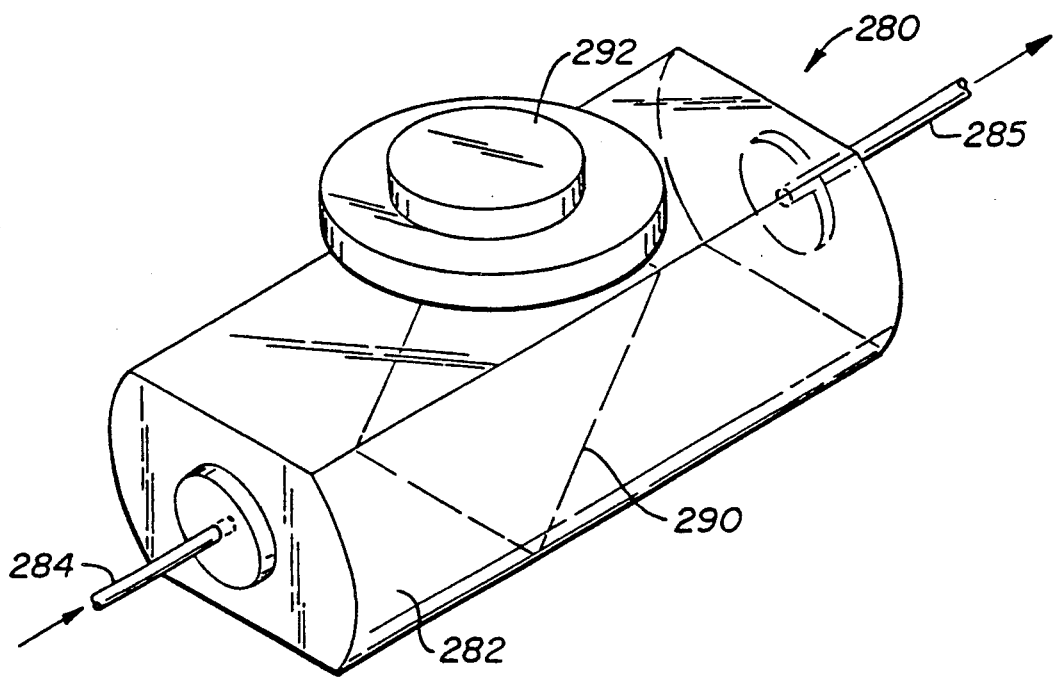
FIG._9A.
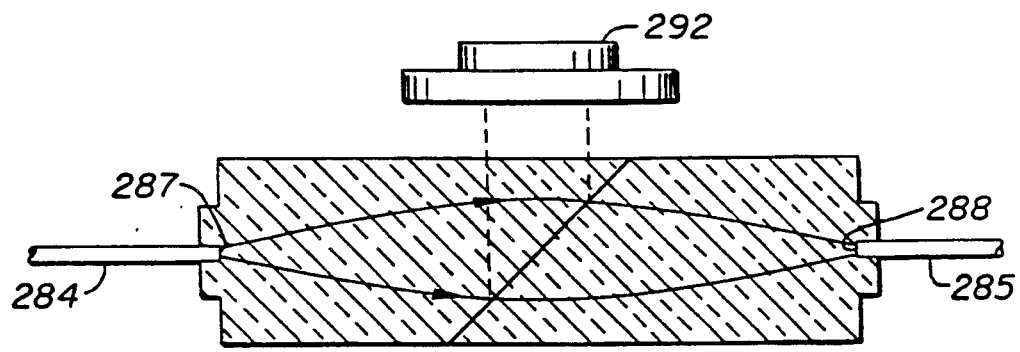
FIG._9B.

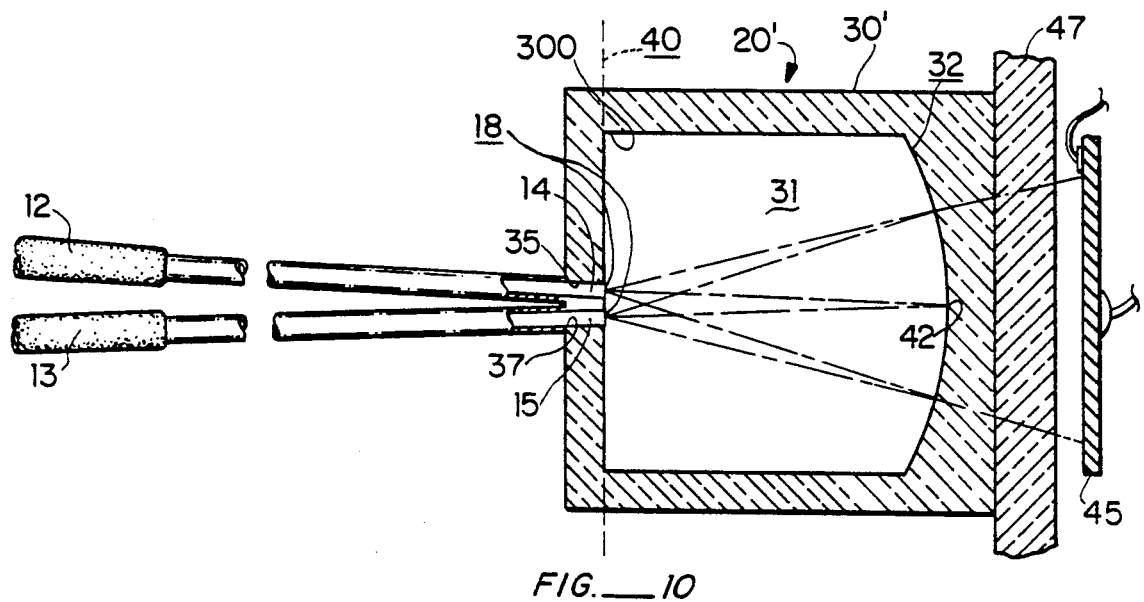
FIG._10
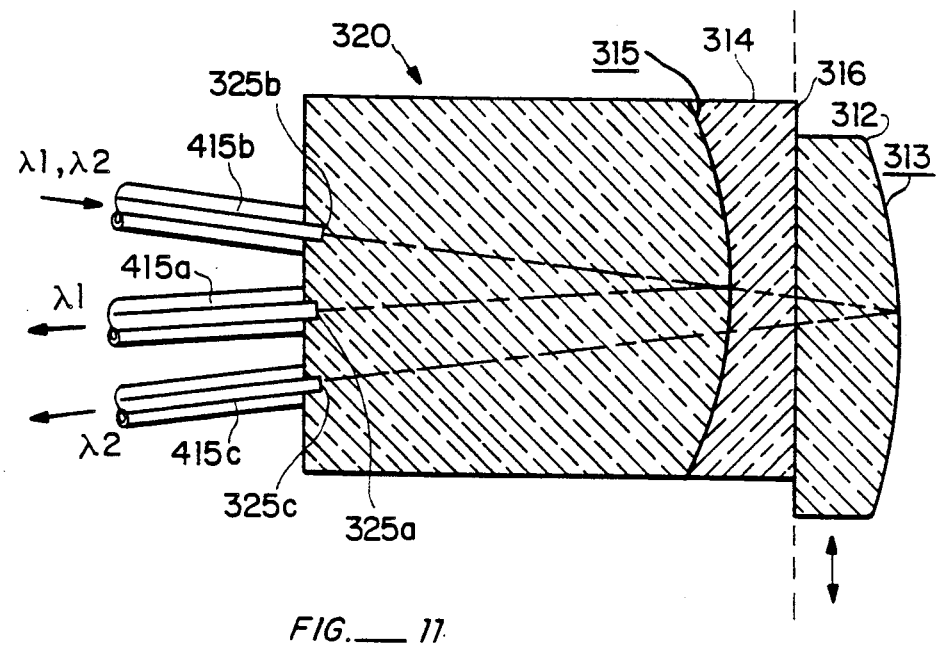
FIG._11

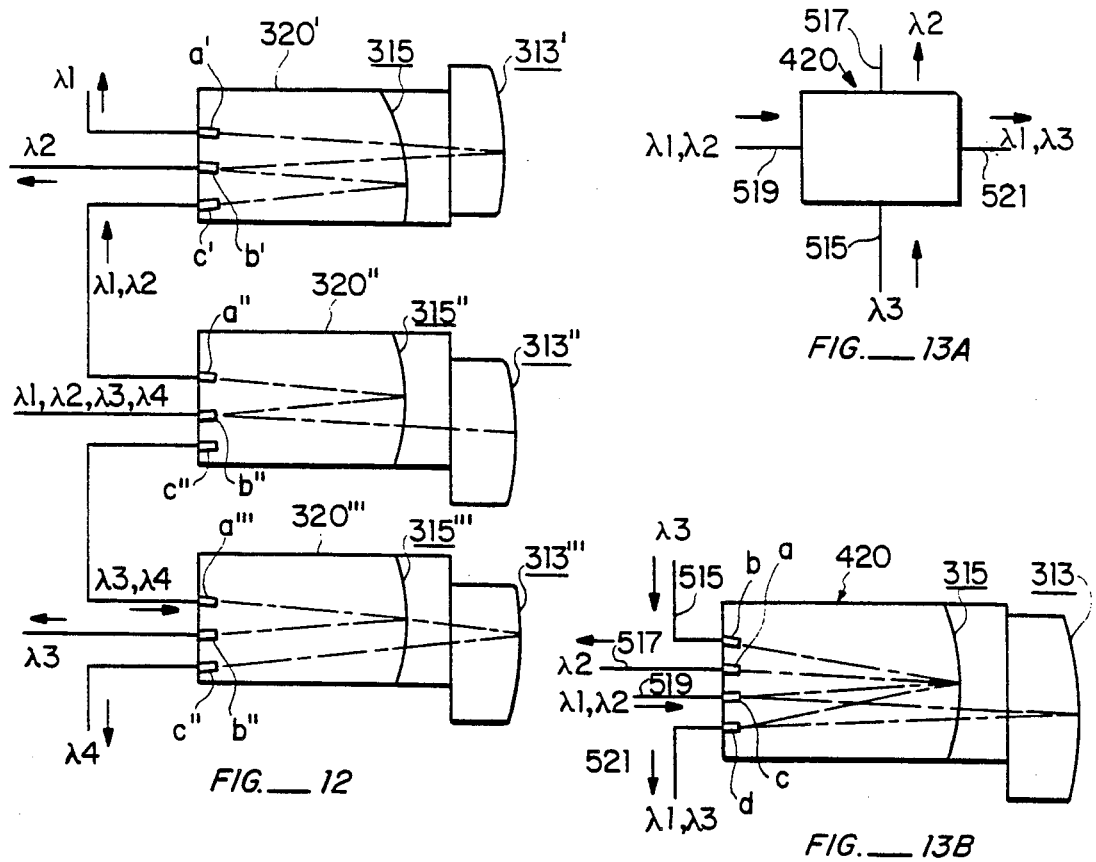
FIG._12
FIG._13A
FIG._13B
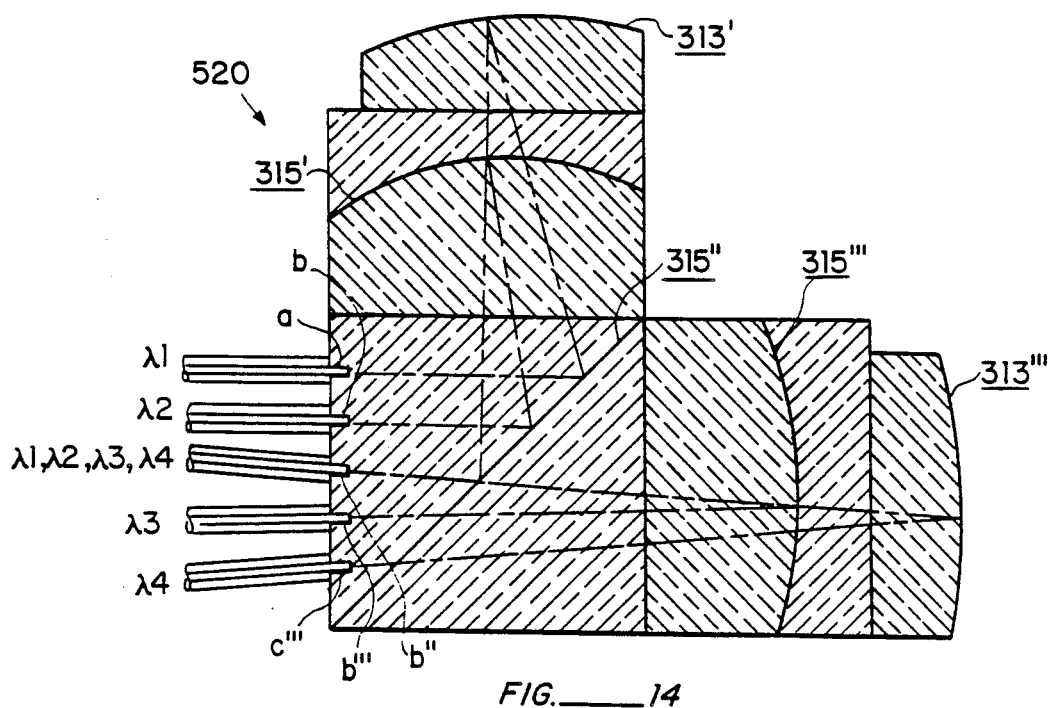
FIG._14

FIBER OPTICS COMMUNICATION MODULES

REFERENCE TO RELATED APPLICATIONS

This is a continuation of application Ser. No. 425,440, filed Oct. 23, 1989, now abandoned, which is a file wrapper continuation of application Ser. No. 06/802,066, filed Nov. 25, 1985, abandoned; which was a File Wrapper Continuation of application Ser. No. 06/462,296, filed Jan. 31, 1983, abandoned; which was a Continuation-in-Part of application Ser. No. 06/325,256 filed Nov. 27, 1981 which issued as Pat. No. 4,479,697; which was a Continuation-in-Part of application Ser. No. 06/066,367 filed Aug. 14, 1979 which issued as Pat. No. 4,329,017.

FIELD OF THE INVENTION

This invention relates generally to optical fiber communications, and more specifically to modules for intercoupling of light from or to fibers and performing monitoring, splitting, switching, duplexing and multiplexing functions.

BACKGROUND OF THE INVENTION

As existing communication systems have become increasingly overloaded, optical transmission through transparent fibers has been found to provide a means of achieving a smaller cross-section per message, thus enabling an increased capacity within existing conduit constraints. The basic medium of transmission is an optical fiber. A first type of fiber is a stepped index fiber which comprises a transparent core member and a transparent cladding, the core member having a higher index of refraction than the cladding. Light is transmitted through the core, and contained within the core by internal reflection. So long as the light does not deviate from the fiber axis by more than the complement of the critical angle for the core-cladding interface, total internal reflection with substantially no loss results. A second type of fiber is a graded index fiber whose refractive index gradually decreases away from the fiber axis. Transmission is highly reliable, and is substantially insensitive to electrical noise, cross coupling between channels, and the like.

As with any communication medium, once a suitable transmission line has been found, the need arises for modules to couple sources and detectors to the line, couple lines together, perform switching, splitting, duplexing, and multiplexing functions. Ultimately, the total system can be no more reliable than these modules. When it is considered that the core of a typical optical communication fiber is characterized by a diameter of only 60 microns, it can be immediately appreciated that such modules must be fabricated and installed to highly precise tolerances.

In order to realize the inherent reliability of optical fiber communication systems, the modules themselves must be highly reliable since they are typically installed in relatively inaccessible locations (e.g. within conduits running under city streets, etc.). Given this requirement, it can be seen that it would be highly desirable to have monitoring signals that would verify the operation of the modules and the integrity of the fibers themselves. A further requirement for a satisfactory optical communication system is that the modules introduce a minimum of loss into the system. It has only been with the development of extremely high transparency fibers that optical fiber communication has become practical, and the introduction of lossy modules would considerably undercut the advantages and efficacy of such systems.

Unfortunately, existing devices for interfacing fibers to sources, detectors, and each other, have proved to be lossy, bulky, delicate, and expensive. Thus, while fiber optic communication systems are proving to be highly advantageous they are prevented from realizing their fullest potential.

SUMMARY OF THE INVENTION

The present invention provides modules for interfacing optical fibers with very low light loss and with provision for monitoring of the optical signal. The modules according to the present invention are characterized by the precise tolerances required in high capacity optical communication systems and yet may be mass produced at reasonable costs.

A device according to the present invention comprises a transparent imaging element having a curved reflective surface at one end and prealigned fiber insertion holes at the other end. The transparent element is characterized by an index of refraction equal to that of the fiber core, and the fibers are glued in their respective holes with index matching cement. Alternatively the index of refraction of the fibers is matched to the index of refraction of the medium between the reflective surface and the fibers. The holes facilitate precision alignment and provide mechanical strength. The curved reflective surface is characterized by a focal plane or self-conjugate plane having the property that a point source of light at a first location in the focal plane or self-conjugate plane is imaged at a second complementary location in the focal plane or self-conjugate plane, and the fiber insertion holes maintain the ends of the fibers at suitable complementary locations within the focal plane or self-conjugate plane. In this context, the term "fiber insertion hole" should also be taken to include a hole sized to maintain a light source or detector at a given location within the focal plane or self-conjugate plane. In some applications, the source or detector would be directly mounted to the transparent imaging element, while in other applications the source or detector would communicate with the imaging element via a short length of fiber.

In embodiments where the index of refraction of the fibers is to be matched to that of the medium between the reflective surface and the fibers, the boundary of the medium and the fibers may be provided with a matching element. The matching element may be a one-quarter wavelength thick coating of a suitable anti-reflective medium, such as magnesium fluoride.

The use of a transparent imaging element characterized by an index of refraction equal or matched to that of the fiber core has the important advantage that fresnel reflection at the fiber end, a significant potential source of loss of the signal, is minimized. Also, refraction which would spread the light, thus necessitating a larger reflective surface, is avoided. Moreover, the use of prealigned fiber insertion holes wherein the fiber ends are cemented into automatic registered position with index matching cement results in a monolithic structure that is dimensionally stable and sufficiently rugged to provide many years of trouble free operation. A further advantage of the monolithic structure wherein reflective light losses are avoided is that reflected light pulses that could affect other communication lines within the system are avoided.

According to one aspect of the present invention, the reflective surface is chosen to transmit a selected fraction of the light falling on the surface so that the signal being coupled through the device may be monitored. Typically, a small fraction (e.g. 1%) of the light is transmitted for this purpose. The signal extracted for monitoring purposes is insensitive to mode structure within the fibers. In view of the minimal losses due to the monolithic structure, this monitoring fraction does not significantly degrade the overall system efficiency. The reflective surface is preferably a multilayer dielectric coating on the polished curved surface of the transparent imaging element or on the surface of a cavity forming the imaging element. Depending on system requirements, the fraction of the signal extracted for monitoring purposes may be selected over a wide range by adjusting the characteristics of the multilayer dielectric coating.

According to a further aspect of the present invention, the reflecting surface is a spherical surface with the focal plane passing through the center of curvature and perpendicular to a radial axis with complementary points being located a short distance on opposite sides of the center of curvature in the focal plane. The fiber insertion holes for fibers to be coupled are preferably inclined with respect to one another so that their axes, when extended, intersect the reflective surface at a common point of intersection. This has the desirable effect of preserving modes or angles (e.g. the axial ray from one fiber is incident to the second fiber along that fiber's axis). The spherical surface, in addition to preserving angles, is characterized by a minimum of aberration.

A coupler according to the present invention provides paired fiber insertion holes on opposite sides of the axis and having bottoms lying in the focal plane. The light emerging from the core of one fiber is imaged by the reflecting surface onto the core of the other fiber. A light source such as an LED may be provided at one of the fiber insertion holes, in order to make a source/fiber coupler. Typically, the source requires a larger diameter hole than if a fiber alone were being inserted, but is conceptually and functionally no different from a fiber. The coupler (which may be a fiber/fiber coupler or a source/fiber coupler) is preferably provided with a reflective surface having enough transmissivity to provide a monitoring signal (as described above).

A splitter according to the present invention divides light carried by an input fiber evenly among a plurality of output fibers. Assuming that there are N such output fibers, the reflective surface is configured to have N pie-shaped spherical surface segments having wedge angles 360°/N and sphere centers between the center of the input fiber and the center of a respective output fiber. A plane reflecting surface may be interposed between each output fiber and a pie-shaped segment of the light cone from the input fiber, in which case the spherical surface segments do not abut one another. The division of energy in such an N-way splitter is insensitive to azimuthal mode structure.

A single-pole/N-throw switch according to the present invention has an input fiber, a plurality of output fibers, and a single continuous smooth imaging surface. In order to selectively communicate optical information between the input fiber and one of the output fibers, the switch is provided with pivot means for allowing rotation of the reflective surface about a point between the focal plane and the reflective surface so that the optic axis may be caused to intersect the focal plane at varying positions depending on the rotation, and indexing means for maintaining the reflecting surface in a selected one of a plurality of positions wherein the optic axis intersects the focal plane substantially midway between the input fiber end and the corresponding output fiber end. Electromagnet coils may be used to selectively cause the pivoting. The transparent element may be fabricated from flexible material and provided with a necked portion for flexing, or may be rigid and articulated, having, for example, an optical ball bearing interface.

Duplexing, multiplexing, and demultiplexing are carried out according to the present invention by having multiple optical signals of differing wavelengths transmitted simultaneously on a single optical fiber. A device that will perform duplexing, multiplexing and demultiplexing comprises classifying means co-operating with the imaging reflective surface so that light of a first wavelength emanating from the fiber end is imaged at a first location and light of a second wavelength emanating from the fiber end is imaged at a second location displaced from the first position. If a light source of the first wavelength is positioned at the first image location and a detector sensitive to light of the second wavelength is positioned at the second image location, the device functions as a duplexer, a corresponding device with source and detector reversed at the other end providing a duplexed system. If sources of light at the first and second wavelengths are placed at the respective image locations, the device functions as a multiplexer. If detectors sensitive to light of the first and second wavelength are positioned at the first and second image locations, the device functions as a demultiplexer. The classifying means may be dichroic beam splitter surfaces so that light of a particular wavelength is reflected from the path and sent to a separate imaging surface. Alternately, the imaging surface and the classifying means may be together defined by a concave reflection grating.

According to an alternative embodiment, multiplexing and demultiplexing may be carried out in accordance with the invention by providing first and second image reflective surfaces arranged along parallel optical axes. Means are provided for locating a source, a detector or a fiber at selected first and second self-conjugate locations of each of said first and second reflective surfaces. The second spherical reflective surface disposed in the optical path between the first spherical reflective surface and the self-conjugate locations is provided with a dichroic coating for selectively transmitting and reflecting optical signals impinging from selected source locations. The first reflective surface may be translatable transverse of the parallel axes relative to the second reflective surface for steering images of selected wavelengths to other self-conjugate locations independent of the self-conjugate locations defined for the first reflective surface. Alternatively, the reflective surfaces may be fixed. The device may be provided with a solid transparent spacer which may alternatively serve as a sliding bearing surface for laterally translating a solid body supporting the first reflective surface. The solid body may be transparent material having a convex surface forming a concave reflector.

Stages of such devices may be stacked together, provided with beam splitting mirrors, or linked by means of optical fibers to obtain multiple wavelength taps and multiple wavelength multiplexers and demultiplexers.

For a further understanding of the nature and advantages of the present invention, reference should be had to the remaining portions of this specification and to the attached drawings.

BRIEF DESCRIPTION OF THE DRAWINGS

FIG. 1 is an isometric cut-away view of a fiber/fiber coupler according to the present invention;

FIG. 2 is a simplified cross-sectional view of the coupler of FIG. 1;

FIG. 3 is a simplified cross-sectional view of a source/fiber coupler;

FIGS. 4A and 4B are simplified cross-sectional views of different embodiments of a splitter according to the present invention;

FIGS. 5A and 5B are simplified cross-sectional views of alternate embodiments of a switch according to the present invention;

FIG. 6 is an exploded view of the switch of FIG. 5B showing a mechanism for achieving increased precision;

FIGS. 7A and 7B are simplified cross-sectional views of alternate embodiments of two colored duplexers;

FIGS. 8A, 8B and 8C are simplified cross-sectional views of multiplexer and demultiplexer embodiments;

FIGS. 9A and 9B show a directional monitor.

FIG. 10 is a side cross-sectional view of a source/fiber coupler illustrating an alternative embodiment.

FIG. 11 illustrates an alternative embodiment of a coupler according to the invention.

FIG. 12 illustrates a multiple wavelength multiplexer according to the invention.

FIG. 13A s a schematic representation of a three wavelength tap.

FIG. 13B illustrates a particular three wavelength tap according to the invention.

FIG. 14 illustrates an alternative multiple wavelength multiplexer according to the invention.

DESCRIPTION OF THE PREFERRED EMBODIMENTS

The present invention relates to modules for interfacing optical fibers with each other, with light sources, and with detectors. This is generally accomplished by positioning detectors, sources, or respective ends of such fibers in a focal plane as will be described below. It will be immediately apparent to one of ordinary skill in the art that an input fiber and a light source may be substituted for one another, that an output fiber and a detector may be substituted for one another, and that the system may be "time reversed" by interchanging inputs and outputs. Therefore, while the description that follows is in specific terms, such equivalent systems will be made readily apparent.

FIG. 1 is an isometric cut-away view of a fiber/fiber coupler 10 according to the present invention. Coupler 10 couples input and output fiber optic cables 12 and 13 having respective fibers 14 and 15 therein so that optical information traveling within the core of input fiber 14 is transmitted to the core of output fiber 15 with low loss. An electrical output signal proportional to the optical signal power in fiber 14 is provided by monitor unit 16 at an electrical output terminal 17 (preferably a "BNC" output connector). Fibers 14 and 15 optically communicate with a transparent imaging element 20 within a housing 21 as will be described below, the optical communication requiring precise registration of the ends of the fibers. Gross mechanical positioning of the fiber optic cables is accomplished by a clamping mechanism 22 comprising grooved mating body portions 25 for positioning and holding the cables. Elastomeric compression seals 27 provide strain relief when mating portions 25 are tightly fastened to one another, as for example by screwing.

FIG. 2 is a cross-sectional view of transparent imaging element 20 with fibers 14 and 15 registered thereto. Imaging element 20 comprises a body 30 of transparent material, body 30 having a curved surface 32 at a first end and paired cylindrical fiber insertion holes 35 and 37 at a second end. Surface 32 is a polished surface and coated with a reflective coating such as a multilayer dielectric coating that reflects most of the light incident on it from within transparent body 30, but transmits a small fraction. Surface 32 is characterized by a focal plane 40 having the property that a point source in focal plane 40 is imaged in focal plane 40. Surface 32 is preferably spherical, in which case focal plane 40 is perpendicular to a radial axis and passes through the center of curvature. Fiber insertion holes 35 and 37 are of a diameter to accommodate fibers 14 and 15 and to maintain the fiber ends at precisely registered locations in focal plane 40 such that the cone of light emanating from the end of fiber 14 is imaged on the end of fiber 15. Body 30 is preferably formed from a transparent plastic by an injection molding process. The transparent material is chosen to have an index of refraction equal to that of the fiber core, and the fiber ends are glued into their respective fiber insertion holes with an index matching cement. The fiber insertion holes themselves do not provide the precision alignment, but rather facilitate such alignment which may be carried out in a suitable jig or the like. Once the fibers have been cemented into the holes, mechanical strength is achieved.

Monitor unit 16 comprises a photodetector 45 and an associated protective window 47. Monitor unit 16 is located outside transparent body 30 in a position to intercept the light that is transmitted by the reflective coating on surface 32. Monitor unit 16 is a self contained unit which may be inserted into housing 21 if the monitoring function is required. If no monitoring is required, an opaque plug may close off the end of housing 21.

The ends of fibers 14 and 15 are cleaved perpendicular to the respective axes and located symetrically about the center of curvature within focal plane 40. In order to preserve modes, fiber insertion holes 35 and 37 are inclined with respect to one another so that the axes of the respective fibers are directed to a common intersection point 42 on the axis of surface 32.

As discussed above, a light source may be substituted for input fiber 14 without any change in the functioning of the device. FIG. 3 shows a source/fiber coupler 50 that differs from fiber/fiber coupler 10 only in that a light source 52 is substituted for input fiber 12. The purpose of coupler 50 is to transmit the light from source 52 into a fiber 53. Source 52 may be a metal/ceramic "pillbox" light emitting diode or a laser having an optical coupling plastic window 55 and an oil interface 57 to provide optical continuity and index matching. Since light source 52 has a larger diameter than that of a fiber, the complementary optical points within the focal plane are moved farther away from the center of curvature to accommodate the larger diameter element. In order to maintain mode preservation and minimize aberrations, fiber 53' is inclined at a corresponding larger angle with respect to the optic axis. Where a monitoring function is carried out, the current from photodetector 45 may be used to provide feedback to the power source driving light source 52 to improve the linearity of the dependence of light output on drive current.

FIG. 4A shows a first embodiment of a two-way splitter 60 for dividing the light carried by an input fiber 61 between first and second output fibers 62 and 65. As in the coupler, the basic element of splitter 60 is a transparent body 68 having a reflective surface at one end and fiber insertion holes at the other end. However, the reflective surface is continuous but not mathematically smooth, comprising abutting spherical surface segments 70 and 72. Spherical surface segments 70 and 72 are characterized by the same radius but have respective centers of curvature 75 and 77 that are displaced from the axis of input fiber 61. In particular, center of curvature 75 is midway between the end of fiber 61 and the end of fiber 62; center of curvature 77 is midway between the end of fiber 61 and fiber 65. Generally, for an N way splitter, N pie-shaped surface segments having wedge angles 360°/N and respective sphere centers in a circular array surrounding the end of the input fiber would be required FIG. 4B is a cross-sectional view of an alternate embodiment of a two-way splitter 80 for dividing the light from an input fiber 82 evenly between output fibers 85 and 87. This embodiment differs from the embodiment of FIG. 4A in that each fraction of the input light cone is intercepted by a plane reflecting surface before encountering the corresponding focusing segment. In particular, a transparent body 90 is configured with a wedge-shaped depression 92 which defines respective plane interfaces 95 and 97 that come together at an apex 100 on the axis of input fiber 82. The half cone that reflects from plane surface 95 impinges on a first curved reflective segment 102 and is focused on the end of output fiber 85. Similarly the other half cone is incident on a second curved reflective segment 105 and focused on output fiber 87. This embodiment is typically easier to fabricate than the embodiment of FIG. 4A since all the curved segments, if spherical, may be located with a common center of curvature. The differing points of focus are achieved by providing a wedge angle of slightly more than 90°. Generally, for an N-way splitter with N>2, an N-sided pyramid rather than a wedge is used.

FIG. 5A is a cross-sectional view of a two-way (single-pole/double-throw) switch 110 for selectively directing light traveling along an input fiber 112 to either of paired output fibers 115 and 117. Switch 110 comprises a transparent body 120 having respective fiber insertion holes 122, 125, and 127 at one end, and a continuous, mathematically smooth focusing surface 130 at the other end. Selective switching is accomplished by providing pivoting means to permit reflective surface 130 to rotate relative to the fiber insertion holes about a point 132 intermediate the fiber ends and the reflective surface and located along the axis of input fiber 112. This is accomplished by fabricating body 120 out of a flexible transparent material and providing the body with a necked portion 135 proximate pivot point 132 of relatively small diameter to permit flexing without deformation of the remaining portions of body 120. In particular, when body 120 is flexed about pivot point 132, a body portion 137 moves relative to a body portion 138 to permit the center of curvature of spherical surface of segment 130 to be selectively directed to a point midway between the ends of fibers 112 and 115 or between the ends of fibers 112 and 117.

The rotation is effected by electromagnetic deflection. A soft steel sleeve 140 surrounds body portion 137 having reflective surface 130 thereon and carries tapered wedge sections 142 and 143. For an N-way switch, there are N such wedge sections. Corresponding electromagnets 145 and 146 are mounted to the fixed housing corresponding to each switch position Each electromagnet includes a yoke 147 and a coil 148. The yoke has portions defining a tapered depression with surfaces adapted to mate with the outer surfaces of its respective wedge section on sleeve 140 in order to index movable body portion 137 to the desired position. Magnetic latch elements 150 may be provided to maintain a given switch position after the respective electromagnet current has been turned off.

FIG. 5B is a simplified cross-sectional view showing an alternate embodiment of a two-way switch. This embodiment differs from that of FIG. 5B in that the body comprises two relatively movable portions 155 and 157 having a spherical interface 160 therebetween to define an optical ball bearing. The variable region between body portions 155 and 157 is filled with a silicone oil reservoir 162 being bounded by a suitable bellows 165. The two mating parts are maintained in tension against one another by a magnet or spring (not shown). While FIGS. 5A and 5B illustrate two-way switches, it will be immediately appreciated that an N-way switch is achieved by the provision of additional input fiber insertion holes, additional indexing electromagnets, and corresponding tapered wedge sections on the sleeve.

FIG. 6 illustrates an additional embodiment of an indexing system suitable for either of the two switch embodiments described above, but illustrated for the embodiment of FIG. 5B for definiteness. It will be immediately apparent that the angular positioning of movable body portion 157 with respect to fixed body portion 155 having fiber insertion holes therein is extremely critical &o proper operation of the switch. In particular, this translates into precise tolerances on the fabrication of the sleeve surrounding the movable body portion and the location of the electromagnets. It has been found that increased precision of angular orientation can be achieved by separating the wedges and electromagnets from the movable body portion along the axial direction. In particular, an axial lever arm 170 rigidly couples a sleeve 172 surrounding movable body 157 with a soft steel ring 175 having tapered wedged portion 177 mounted thereon in the same fashion that tapered wedged portion 142 and 143 were mounted to sleeve 140 in FIG. 5A. Sleeve 172, lever arm 170 and ring 175 are coaxially aligned. Electromagnets, not shown, cooperate with wedges 177 and precisely the same manner that electromagnets 145 and 146 cooperated with wedges 142 and 143 in FIG. 5A.

FIG. 7A is a simplified cross-sectional view of a duplexer 180 according to the present invention. The purpose of duplexer 180 is to permit optical information to be transmitted simultaneously in both directions on a single fiber 182. This is accomplished by using optical signals of differing wavelengths for the different directional transmission, and incorporating classification means to separate the optical signals. In particular, duplexer 180 couples a source 185 of light of a first wavelength and a detector 187 sensitive to light of a second different wavelength to fiber 182. While source 185 and detector 187 are shown communicating to duplexer 180 by short fibers 190 and 192, such sources and/or detectors could be directly mounted to the duplexer. Duplexer 180 itself comprises a transparent body 195 having a curved surface at one end and fiber insertion holes at the other end. However, in contrast with the devices described above, the curved surface carries a concave reflection grating 197. Grating 197 has the property that light emanating from a point in a curved focal surface is imaged at different locations in the focal surface depending on the wavelength of the light. Different image points are determined by the spacing of the grating lines and the particular wavelengths involved. Thus, fiber 190 has its end at the complementary position with respect to the end of fiber 182 for the first wavelength and fiber 192 has its end at a complementary position with respect to the end of fiber 182 for the second wavelength. Thus, light from source 185 is imaged onto the end of fiber 182 and transmitted away from duplexer 180 while light of the second wavelength traveling along fiber 182 in a direction toward duplexer 180 is imaged onto the end of fiber 192 and thus transmitted to detector 187.

FIG. 7B illustrates an alternate embodiment of a duplexer 200 wherein the classification means and the imaging means are separated. In particular, a dichroic beam splitter interface 202 is reflective with respect to light of the first wavelength and transmissive with respect to light of the second wavelength. Beam splitter interface 202 is disposed at approximately 45° from the axis of fiber 182 so that light of the first wavelength is significantly deviated from its original path. Separate reflective imaging elements 205 and 207 cooperate with beam splitter surface 202 in order to couple light of the first wavelength between source 185 and fiber 182 and light of the second wavelength between fiber 182 and detector 187. In a duplex system, a similar duplexer would be employed at at remote end of fiber 182, except that source 185 and detector 187 would be replaced by a detector sensitive to light of the first wavelength and a source of light of the second wavelength, respectively.

FIG. 8A shows a first embodiment of a threecolor multiplexer for simultaneously transmitting optical information from three sources 212, 215, and 217 along a single fiber 220. Multiplexer 210 comprises a transparent body 222 having a concave reflection grating 225 as described in connection with duplexer 180. In fact, duplexer 180 could be converted to a two color multiplexer by substituting a source of light of the second wavelength for detector 187.

FIG. 8B shows a three color demultiplexer 230 for receiving simultaneous transmission of light at three wavelengths along a fiber 232 and sending the light to three detectors 235, 237 and 240. Since the light from the different wavelengths is spatially separated, detectors 235, 237 and 240 could be detectors that are sensitive to all three wavelengths, although selective wavelength detectors may be preferable. Demultiplexer 230 is substantially identical to multiplexer 210 and comprises a transparent body 242 having a concave reflection grating 245 at one end and fiber insertion holes at the other.

FIG. 8C shows an alternate embodiment of a three color multiplexer 250 for transmitting light at three wavelengths from respective sources 252, 255 and 257 along a single fiber 260. This is accomplished by two dichroic beam splitter surfaces 262 and 265 and separate reflective imaging elements 270, 272, and 275. This embodiment functions substantially the same as duplexer 200 shown in FIG. 7B.

The couplers described above have the properLy that they are bidirectional, that is, that the direction of light travel can be reversed and the device will still function in the same way. However, it sometimes happens that directionality is required in the monitoring or splitting operation. FIGS. 9A and 9B illustrate a coupler 280 having a directional monitoring feature. In particular, a directional coupler 280 comprises a body of graded index (self focusing) material 282 for coupling first and second fibers 284 and 285. Graded index material has the property that a point source at a first axial location is imaged at a second axial location. Thus, in order to couple fibers 284 and 825, respective fiber ends are located at complementary axial positions 287 and 288. A beam splitter surface 290 is interposed at an oblique angle in the path of the light and reflects a small fraction to a suitable detector 292. Due to the oblique inclination, detector 292 only receives light when the light is traveling from fiber 284 to fiber 285.

FIG. 10 is a cross-sectional view of a transparent imaging element 20' with fibers 14 and 15 registered thereto. Imaging element 20' comprises a cavity 300 within a body 30' of material, body 30' having a curved surface 32 at a first end and paired cylindrical fiber insertion holes 35 and 37 at a second end. Surface 32 is a polished surface and coated with a reflective coating such as a multilayer dielectric coating that reflects most of the light incident on it from within cavity 300, but transmits a small fraction. Surface 32 is characterized by a focal plane 40 having the property that a point source in focal plane 40 is imaged in focal plane 40. Surface 32 is preferably spherical, in which case focal plane 40 is perpendicular to a radial axis and passes through the center of curvature. Fiber insertion holes 35 and 37 are of a diameter to accommodate fibers 14 and 15 and to maintain the fiber ends at precisely registered locations in focal plane 40 such that the cone of light emanating from a point source at the end of fiber 14 is imaged on the end of fiber 15. Body 30' is preferably formed from a plastic by an injection molding process.

Means are provided for matching the index of refraction of the fiber cores to the index of refraction of a medium 31 within the cavity 300. The medium 31 may be a vacuum, a transparent gas or other transparent mass whose index of refraction is other than precisely that of the core of the fibers 35 and 37. To this end the matching means may be an optical frequency matching element such as a coating of a medium 18 having an index of refraction intermediate of the indices of refraction of the medium 31 and fibers 35 and 37. Magnesium fluoride in a thickness of one-quarter wavelength at the operational wavelength of signals is suitable between optical glass and air. Adjustments may be made to thickness of the matching medium 18 to accommodate differences in indices of refraction between the optical fibers and to achieve a precise optical impedance match. The other structures disclosed herein may employ the basic structure as disclosed in connection with either FIG. 10 or FIG. 2.

Turning to FIG. 11 there is shown a further embodiment of a device according to the invention. The device is a coupler 320 which may operate as a duplexer, multiplexer, or demultiplexer, depending on the nature of the fibers and transceivers. This embodiment utilizes a concave mirror assembly 312 having a reflective rear surface 313 as the focusing means, so that light of the second wavelength that passes through a dichroic surface 315 is imaged by mirror 312 at a location, designated 325c, that is on the same side of dichroic surface 315 as are locations 325a and 325b. Preferably, location 325c is proximate locations 325a and 325b. This is achieved by having the center of curvature of dichroic surface 315 lie between locations 325b and 325a and the center of curvature of mirror surface 313 lie between locations 325b and 325c. FIG. 8 shows three fibers 415a, 415b, and 415c having their respective ends registered at locations 325a, 325b, and 325c. Fiber 415b carries signals at both the first and second wavelengths, and depending on the arrangement of sources and detectors coupled to fibers 415b and 415c, coupler 320 will operate as a duplexer, a multiplexer, a demultiplexer or the like.

The embodiment of FIG. 11 may include a solid transparent spacer 314 interposed between the mirror assembly 312 and the dichroic surface 315. The mirror assembly 312 may be a solid transparent body having a reflective surface 313 as a coating on the outer convex surface of the concave mirror assembly 312. The mirror assembly 312 is translatable along a common margin 316 between the mirror assembly 312 and the spacer 314. The spacer 314 assures correct alignment between the dichroic surface 315 and the reflective surface 313.

FIG. 12 illustrates a multiple wavelength multiplexer constructed of devices as shown in FIG. 11. Four signals are introduced (or in the reverse signal path received) through a terminal b″ of coupler 320″. Reflective surface 313″ is reflective of third and fourth wavelength signals to direct them by geometry to terminal c″ and through a fiber to terminal a″ of coupler 320″. Dichroic surface 315″ is transparent of the third and fourth wavelength signals but is reflective of the first and second wavelength signals. The first and second wavelength signals are directed by geometry through terminal a″ of coupler 320″ to terminal c′ of coupler 320′.

Dichroic surface 315′ is reflective of second wavelength signals but transparent to first wavelength signals. Dichroic surface 315′ is positioned to image location c′ to location b′ of coupler 320′ while reflective surface 313′ is positioned to image location c′ to location a′ of coupler 320′. Thus, first wavelength signals may be separated from second wavelength signals in coupler 320′.

Similarly in coupler 320‴, dichroic surface 315‴ is reflective of only third wavelength signals, which are imaged from location a‴ to location b‴, and reflective surface 313‴ is reflective of fourth wavelength signals, which are imaged from location a‴ to location c‴ as a consequence of the positioning of the center of curvature of reflective surface 313‴.

The coupler system of FIG. 12 may be rendered substantially more compact and in a different form although with an equivalent function. FIG. 14 is a representative of a four wavelength multiplexer/demultiplexer device 520 whose functional capabilities are equivalent to those of the coupler system of FIG. 12. To aid comparison, elements in device 520 of functional equivalence to the elements of the system of FIG. 12 are given identical numerals.

Second dichroic 315″ is a flat dichroic medium on a boundary in a beam splitter in the optical path of all optical signals. The device 520 has five terminals, terminal location b″ for multiple wavelength signal input and four terminal locations a′, b′, b‴ and c‴ for single wavelength output. The first dichroic surface 315′ and the first reflective surface 313′ are in the reflective path of the second dichroic surface 315″ with the effective centers of curvature between locations b″ and, b or a′, respectively.

The third dichroic surface 315‴ and third reflective surface 313‴ are in the transmission path of the second dichroic surface 315‴ with the effective centers of curvature between locations b″ and, b‴ or c‴, respectively.

FIGS. 13A and 13B illustrate a three wavelength tap 420 according to the invention. As shown diagrammatically in FIG. 13A, first, second, third and fourth fibers 515, 517, 519 and 521 join in a four port device and redistribute signals between two input ports and two output ports. First and second wavelength signals may enter together on third fiber 519. Third wavelength signals may enter on first fiber 515. Second wavelength signals may exit on second fiber 517 and first and third wavelength signals may exit on fourth fiber 521.

These functions are accomplished in a three wavelength tap 420 as shown in FIG. 13B. Four fibers are disposed at consecutive locations a, b, c, and d in the focal plane of a second spherical reflective surface formed by a dichroic medium 315 and of a first spherical reflective surface 313. Position a is imaged to position d relative to the second reflective surface 315. Position c is imaged to position b relative to the dichroic surface 315 and to position d relative to the reflective surface 313.

In summary it can be seen that the present invention provides a surprisingly effective series of modules for interfacing optical fibers with a very low light loss and with provisions for monitoring the optical signal. While the above provides a full and complete disclosure of the preferred embodiment of the present invention, various modifications, alternate constructions, and equivalents may be employed without departing from the true spirit and scope of the invention. For example, the splitters and switches described were geometrically symmetric devices. However, there is no need for such geometrical symmetry, nor is there any absolute requirement that the fractions of light transmitted be equal or that the switching be total. Rather, a switch could employ features of a splitter as well in order to provide partial switching and partial splitting. Moreover, while a common focal plane is shown, this is not an absolute prerequisite. Therefore, the above descriptions and illustrations should not be construed as limiting the scope of the invention which is defined by the appended claims.

We claim:

1. A device for coupling the output from a source of light to an end of an optical fiber comprising:
   means defining a spherical reflective surface characterized by a focal plane having the property that a point source of light in said focal plane is imaged in said focal plane, said reflective surface being characterized by a coefficient of reflection sufficiently less than unity to permit a detectable fraction of light incident in said reflective surface to pass therethrough;
   first position defining means for registering said source of light to a first location within said focal plane;
   second position defining means for registering an end of said fiber to a second location within said focal plane and separated from said first location, said first and second locations being on opposite sides of a radial axis, being displaced equal amounts from said radial axis such that the center of curvature of said spherical reflective surface lies on the straight line between said first and second locations, whereby said second location is optically complementary to said first location so that said light source, when positioned at said first location, is imaged on said end of said fiber at said second location; and a photodetector on the side of said reflective surface remote from said focal plane for providing a signal representative of the intensity of said light source when said light source is positioned at said first location.

2. The invention of claim 1 wherein said light source is an end of a second optical fiber, and wherein said first position defining means is sized to maintain said end of said fiber at said first location so that light emanating from said second fiber is imaged on the end of said first fiber and thus transmitted thereinto, such that said device functions as a fiber/fiber coupler.

3. The invention of claim 2 wherein each of said first and second position defining means includes respective fiber alignment means to maintain said fibers oriented so that their axes, when extended toward said reflective surface, intersect one another at a point on said reflective surface so that an axial ray from said second fiber enters said first fiber along the axis of said first fiber.

4. The invention of claim 1 wherein said first source comprises a light emitting diode, and wherein said first position defining means is sized to maintain said light emitting diode at said first location, such that said device functions as a source/fiber coupler.

5. The invention of claim 1 wherein said spherical reflective surface defining means comprises a body of optically transparent material having an index of refraction equal to the index of refraction of said fiber, said body filling the region between said reflective surface and said first and second position defining means, and wherein said reflective surface is defined by an outer surface of said transparent body.

6. The invention of claim 1 wherein said spherical reflective surface defining means comprises means forming a cavity having at a margin opposing said first location a spherical reflective surface and at said first location means juxtaposed to said fiber end for matching the index of refraction of said fiber end to the index of refraction of a medium between said fiber end and said reflective surface.

7. The invention of claim 6 wherein said matching means is an anti-reflective coating.

8. The invention of claim 1 wherein said second position defining means comprises a transparent member optically continuous with said transparent body, said member being located on the side of said focal plane remote from said reflective surface adjacent said second location and being provided with a cylindrical bore having a bottom at said second location, said bore being characterized by a diameter equal to the diameter of said fiber to permit said fiber to be glued thereinto with an index matching cement to provide optical continuity between said fiber and said body.

9. A switch for selectively communicating optical information between an input optical fiber and one of a plurality of N output optical fibers comprising:

means defining a spherical reflective surface;

input fiber positioning means for registering an end of said input fiber to define an axis;

output fiber positioning means for registering respective ends of said input fiber and said output fibers to respective locations within a plane perpendicular to said axis;

pivot means for allowing sufficient rotation of said reflective surface about a point on said axis and removed from the center of curvature of said spherical reflective surface to provide a plurality of N positions wherein the end of said input fiber is imaged at the end of a corresponding are of said output fibers for each position; and indexing means for maintaining said reflective surface in a selected one of said plurality of positions.

10. The invention of claim 9 wherein said indexing means comprises:

an open frame rigidly coupled to said input fiber positioning means and having portions defining a corresponding plurality of inwardly opening tapered depressions; and a member rigidly coupled to said reflective surface and having a corresponding plurality of outwardly protruding tapered wedge elements adapted to mate with said depressions on said frame such that when one of said wedges is seated in its corresponding depression, said reflective surface is in said corresponding position.

11. The invention of claim 10 wherein said member is coupled to said reflective surface by a lever arm to increase the translational motion of said wedge elements for a corresponding angular motion of said reflective surface, whereupon said positions of said reflective surface may be achieved to a precise angular tolerance with relatively loose tolerances on said indexing means.

12. A device for permitting multiple optical signals of differing wavelengths to be transmitted simultaneously in a first optical path and to be transmitted separately in at least second and third optical paths comprising:

means defining a first spherical reflective surface characterized by a focal plane having the property that a point source of light in said focal plane is imaged in said focal plane;

first position defining means for registering an end of a first optical fiber to a first location within said focal plane;

second position defining means for registering an end of a second optical fiber to a second location within said focal plane and separated from said first location, said first and second locations being on opposite sides of a first radial axis and displaced equal distance from said first radial axis such that the center of curvature of said first spherical reflective surface lies on a straight line between said first and second locations, whereby said second location is optically complementary to said first location so that light at said first location is imaged by said first spherical reflective surface at said second location;

means defining a second spherical reflective surface disposed between said first spherical reflective surface and said first location, said second spherical reflective surface defining means having the properties that a point source of light within a first selected wavelength range and in said focal plane is imaged by a dichroic medium in said focal plane, and that a point source of light outside of said selected wavelength range and in said focal plane passes through said second spherical reflective surface defining means and is imaged in said focal plane by said first spherical reflective surface defining means;

third position defining means for registering an end of a third optical fiber to a third location within said focal plane and separated from said first location, said first and third locations being on opposite sides of a second radial axis and displaced equal distance from said second radial axis such that the center of curvature of said second spherical reflective surface lies in a straight line between said first and third locations, whereby said third location is optically complementary to said third location so that light at said first location is imaged by said second spherical reflective surface at said third location; and optically transparent means disposed between said first spherical reflective surface and said second spherical reflective surface for maintaining alignment of said first reflective surface, said second reflective surface and said first, second and third locations.

13. A device as claimed in claim 12 for use as a wavelength selective tap further comprising:

fourth position defining means for registering an end of a fourth optical fiber to a fourth location within said focal plane and separated from said second location, said second and fourth locations being on opposite sides of said second radial axis and displaced equal distance from said second radial axis such that the center of curvature of said second spherical reflective surface lies in a straight line between said second and fourth locations, whereby said fourth location is optically complementary to said second location such that light at said fourth location is imaged by said second spherical reflective surface at said second location.

14. A coupler for multiplexing or demultiplexing a plurality of optical signals of differing wavelengths comprising:

first, second and third couplers according to claim 12, each of said first, second and third couplers having a second spherical reflective surface (designated second prime, second double prime and second triple prime) characterized by different ranges of reflective and transmissive wavelengths, wherein said second double prime spherical reflective surface is reflective of first and second wavelength signals and transmissive of third and fourth wavelength signals, wherein said second prime spherical reflective surface is reflective of said second wavelength signals and transmissive of said first wavelength signals, wherein said second triple prime spherical reflective surface is reflective of said third wavelength signals and transmissive of said fourth wavelength signals; and further comprising fiber means coupled between said second coupler and said first coupler for conveying said first and second wavelength signals between said second coupler and said first coupler, and coupled between said second coupler and said third coupler for conveying said third and fourth wavelength signals between said second coupler and said third coupler.

15. A device for permitting multiple wavelength optical signals to be transmitted simultaneously in a first optical path and to be transmitted separately in at least second, third, fourth and fifth optical paths comprising:

means defining a first spherical reflective surface, means defining a second spherical reflective surface, means defining a third spherical reflective surface, and means defining a fourth spherical reflective surface, said first, second, third and fourth spherical reflective surfaces being characterized by a focal plane having &he property that a point source of light in said focal plane is imaged in said focal plane;

said second spherical reflective surface being transmissive of a second wavelength signal and reflective of a first wavelength signal, said fourth spherical reflective surface being transmissive of a fourth wavelength signal and reflective of a third wavelength signal;

means defining a first planar reflective surface disposed between said first, second, third and fourth spherical reflective surfaces and said focal plane, said first planar reflective surface being reflective of said first and second wavelength signals and transmissive of said third and fourth wavelength signals;

first position defining means for registering an end of a first optical fiber to a first location within said focal plane;

second position defining means for registering an end of a second optical fiber to a second location within said focal plane and separated from said first location, said first and second locations being on opposite sides of a first radial axis of said first spherical reflective surface formed by a reflection upon said first planar reflective surface, said first and second locations being displaced equal distance from said first radial axis such that the center of curvature of said first spherical reflective surface as reflected lies on a straight line between said first and second locations, whereby said second location is optically complementary to said first location so that light of said first wavelength at said first location is imaged by said first spherical reflective surface and said first planar reflective surface at said second location;

third position defining means for registering an end of a third optical fiber to a third location within said focal plane and separated from said first location, said first and third locations being on opposite sides of a second radial axis of said second spherical reflective surface formed by a reflection upon said first planar reflective surface, said second spherical reflective surface being reflective of second wavelength signals and transmissive of first wavelength signals, said first and third locations being displaced equal distance from said second radial axis such that the center of curvature of said second spherical reflective surface, as reflected by said first planar reflective surface, lies on a straight line between said first and third locations, whereby said third location is optically complementary to said first location, so that light of said second wavelength at said first location is imaged by said second spherical reflective surface and said first planar reflective surface at said third location;

fourth position defining means for registering an end of a fourth optical fiber to a fourth location within said focal plane and separated from said first location, said first and fourth locations being on opposite sides of a third radial axis of said third spherical reflective surface, said first and fourth locations being displaced equal distance from said third radial axis such that the center of curvature of said third spherical reflective surface lies on a straight line between said first and fourth locations, whereby said fourth location is optically complementary to said first location, so that light of said fourth wavelength at said first location is imaged by said third spherical reflective surface at said fourth location; and fifth position defining means for registering an end of a fifth optical fiber to a fifth location within said focal plane and separated from said first location, said first and fifth locations being on opposite sides of a fourth radial axis of said fourth spherical reflective surface, said first and fifth locations being displaced equal distance from said fourth radial axis such that the center of curvature of said fourth spherical reflective surface lies on a straight line between said first and fifth locations, whereby said fifth location is optically complementary to said first location, so that light of said third wavelength at said first location is imaged by said fourth spherical reflective surface at said fifth location.

16. The device as claimed in claim 15 wherein all of said reflective surfaces are spaced relative to one another by solid optically transparent media.

17. A splitter for communicating optical information between an input optical fiber and a plurality of output optical fibers comprising:

means defining a plurality of spherical reflective surface segments, each of said reflective surface segments intercepting a predefined angular segment of a cone of light emanating from an end of said input optical fiber and imaging said end of said input optical fiber at one of a corresponding plurality of output image locations; and a corresponding plurality of fiber positioning means for registering an end of a respective output fiber at a corresponding image location so that the light emanating from said input fiber and lying within the respective predefined angular segment is imaged on said output fiber.

18. The invention of claim 17 wherein said image locations lie in a common plane perpendicular to the axis of said input fiber.

19. The invention of claim 17 wherein each of said spherical reflective surface segments is pieshaped, all of said spherical reflective surface segments being in a budding relationship about a common center located along the axis of said input fiber.

20. The invention of claim 17 wherein said body comprises portions defining a corresponding plurality of plane reflective surface segments, each intersecting said predefined angular segment and reflecting said segment to a corresponding one of said spherical reflective surface segments.

21. A fiber optics splitter for communicating optical information between an input fiber and a plurality of N output fibers comprising:

means for registering an end of said input fibers at an input fiber location;

means for registering respective ends of said output fibers at respective output fiber locations displaced from said input fiber location; and means defining a plurality of N spherical reflective surface segments, each of which intercepts a predetermined angular segment of a cone of light emanating from an end of said input fiber and has a center of curvature between said input fiber location and a corresponding one of said output fiber locations to image said end of said input fiber at said corresponding one of said output fiber locations for communication to the output fiber having its end registered thereto.

22. The fiber optics splitter of claim 21 wherein said means defining a plurality of spherical reflective surface segments comprises:

at least a segment of a plano-convex element having a convex surface spaced away from said input and output fiber locations and having a reflective coating deposited thereon to present a concave reflector that intercepts a part of the light emanating from input fiber.

* * * * *